United States Patent [19]

Chevance et al.

[11] Patent Number: 4,615,234
[45] Date of Patent: Oct. 7, 1986

[54] DEVICE FOR WINDING A TRACTION AND THRUST CABLE AND A WINDOW-RAISER PROVIDED WITH SUCH A DEVICE

[75] Inventors: Claude P. Chevance, Savigny; Jean-Claude Meyer, La Membrolle, both of France

[73] Assignee: Compagnie Industrielle de Mechanismes en abrege C.I.M., France

[21] Appl. No.: 693,555

[22] Filed: Jan. 22, 1985

Related U.S. Application Data

[63] Continuation of Ser. No. 310,179, Oct. 9, 1981, abandoned.

[51] Int. Cl.⁴ .......................... F16C 1/10; G05G 1/08; E05F 11/48
[52] U.S. Cl. ..................... 74/501 R; 74/506; 49/352; 242/54 A
[58] Field of Search ............. 74/501 R, 527, 504–507; 242/54 A, 84.2, 86.5 R, 86.8, 157 R; 49/352; 254/374

[56] References Cited

U.S. PATENT DOCUMENTS

| 1,076,870 | 10/1913 | Dahl | 74/501 R |
|---|---|---|---|
| 1,176,450 | 3/1916 | Horne | 74/505 |
| 2,274,883 | 3/1942 | Brach | 242/100 |
| 2,341,401 | 2/1944 | White | 242/54 A |
| 2,709,220 | 5/1955 | Spector | 49/352 |
| 2,796,221 | 6/1957 | Carlson | 242/54 A |
| 2,826,092 | 3/1958 | Turtle | 74/505 |
| 3,020,039 | 2/1962 | Hynes et al. | 74/505 |
| 3,108,761 | 10/1963 | Frode | 242/84.2 |
| 3,771,384 | 11/1973 | Hackman | 74/505 |
| 3,897,654 | 8/1975 | Kouth et al. | 49/352 |
| 4,191,065 | 3/1980 | Golobay et al. | 74/527 |
| 4,292,859 | 10/1981 | Teraura | 74/505 |
| 4,351,197 | 9/1982 | Carson | 74/506 |

FOREIGN PATENT DOCUMENTS

| 285066 | 6/1915 | Fed. Rep. of Germany | 74/501 R |
|---|---|---|---|
| 1928185 | 2/1970 | Fed. Rep. of Germany | 49/352 |
| 3001617 | 8/1980 | Fed. Rep. of Germany | 49/352 |

*Primary Examiner*—Gary L. Smith
*Assistant Examiner*—Vinh Luong

[57] ABSTRACT

The device has a drum constituted by a disc in one of the sides of which is formed a generally spiral-shaped groove. A cable retaining cap in the form of a fixed plate is placed against this side of the disc. When winding or unwinding the cable, the latter bears essentially against the lateral walls of the groove and substantially avoids rubbing against the cap. This results in high efficiency of the device and enables the device to be employed in automobile window-raisers.

9 Claims, 14 Drawing Figures

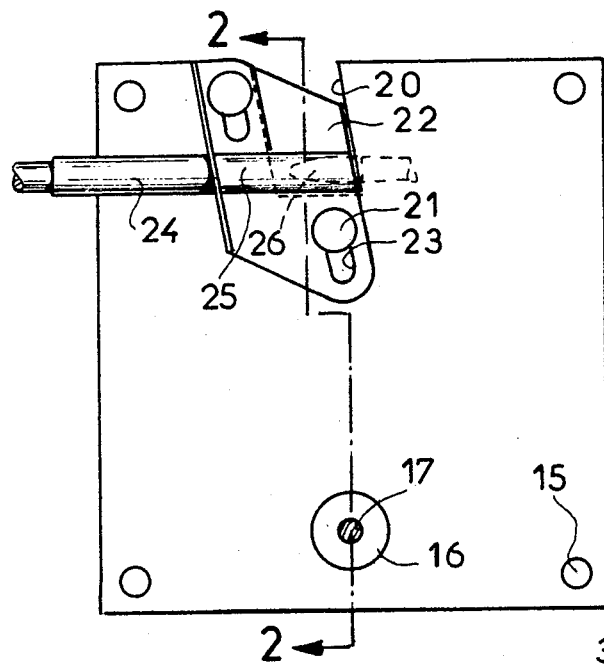
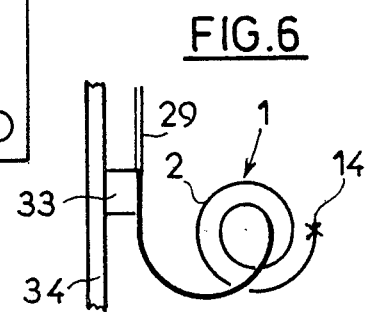
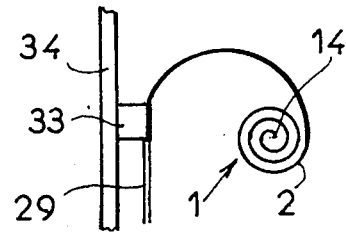
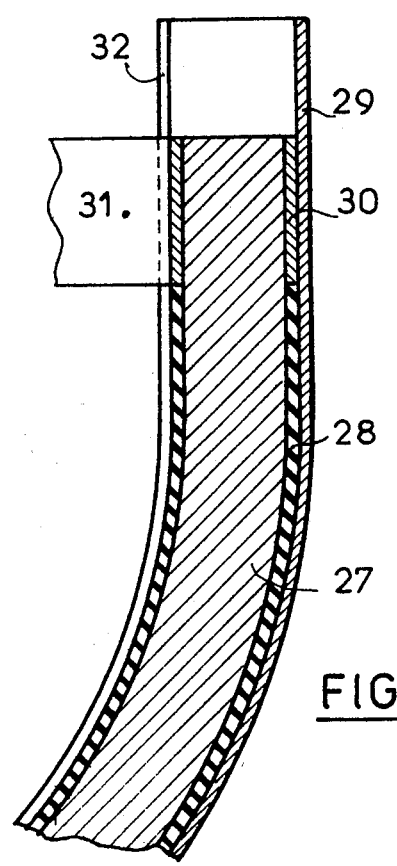
FIG.1
FIG.6
FIG.7
FIG.5

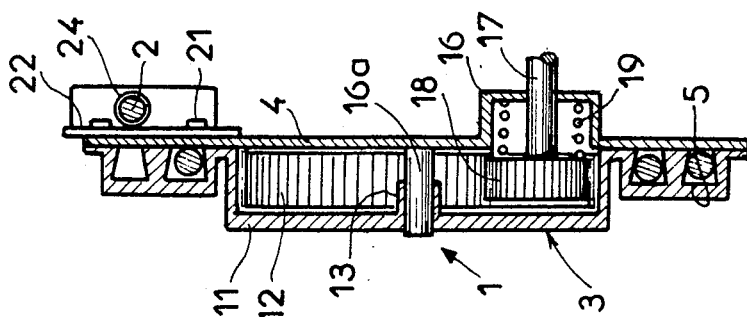
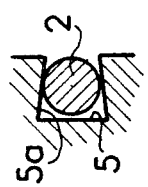
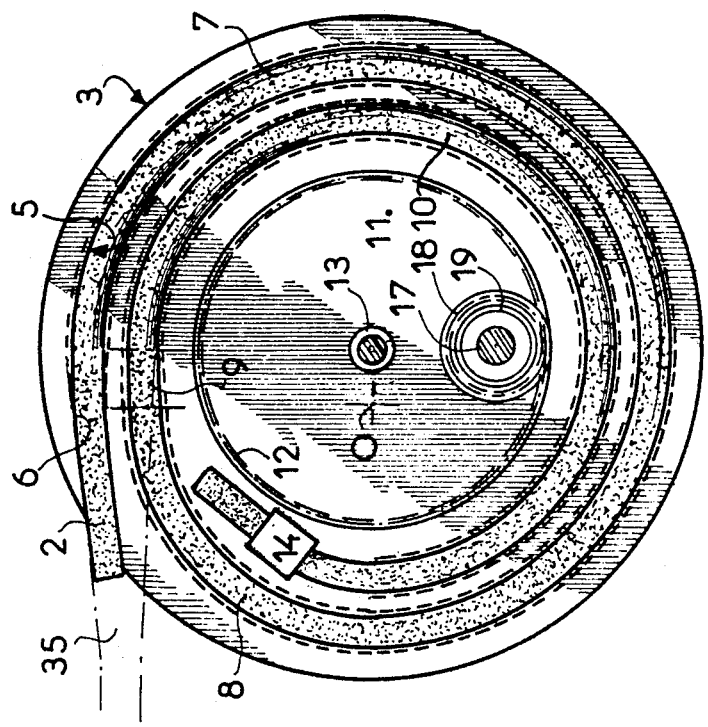

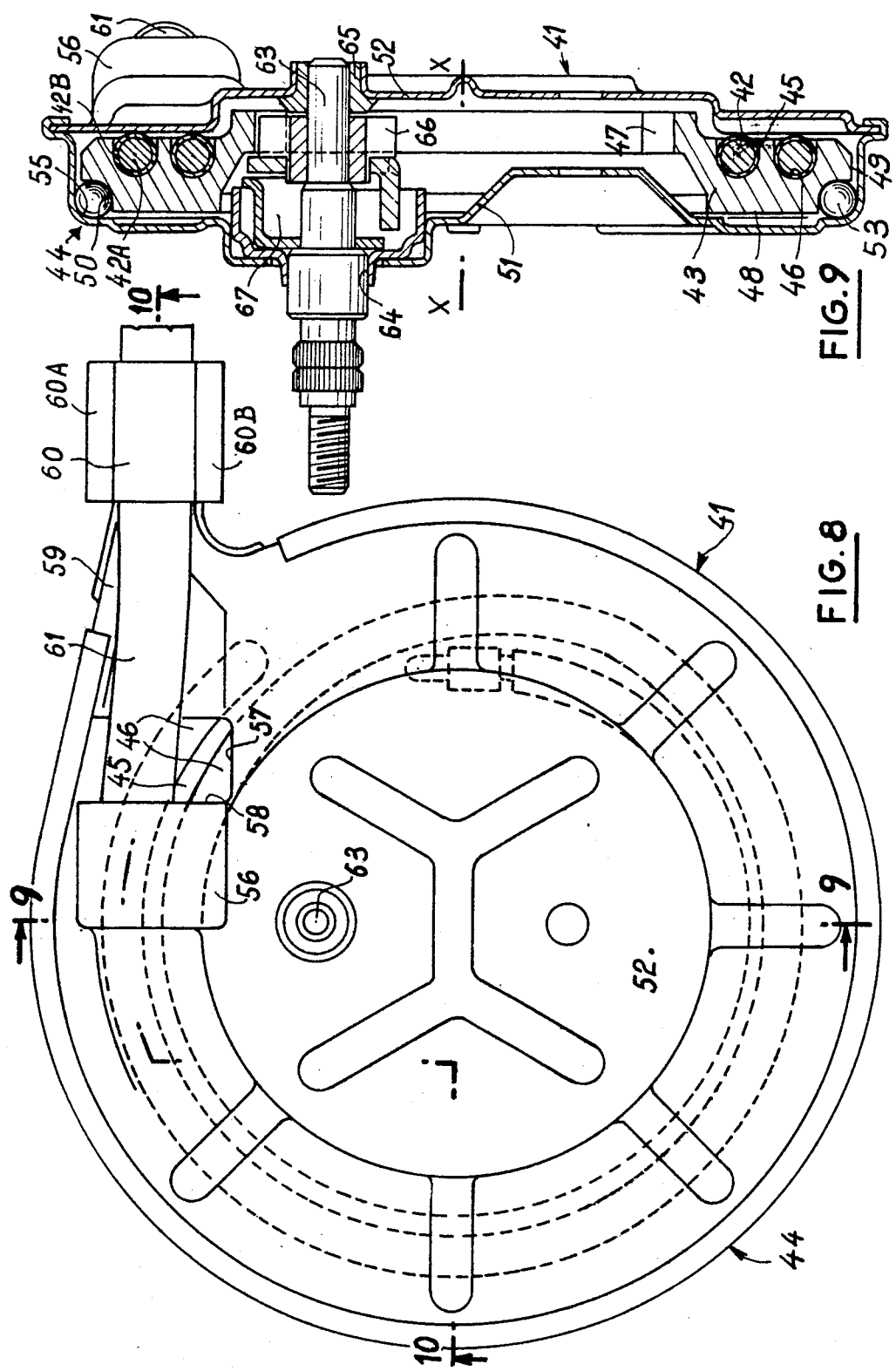

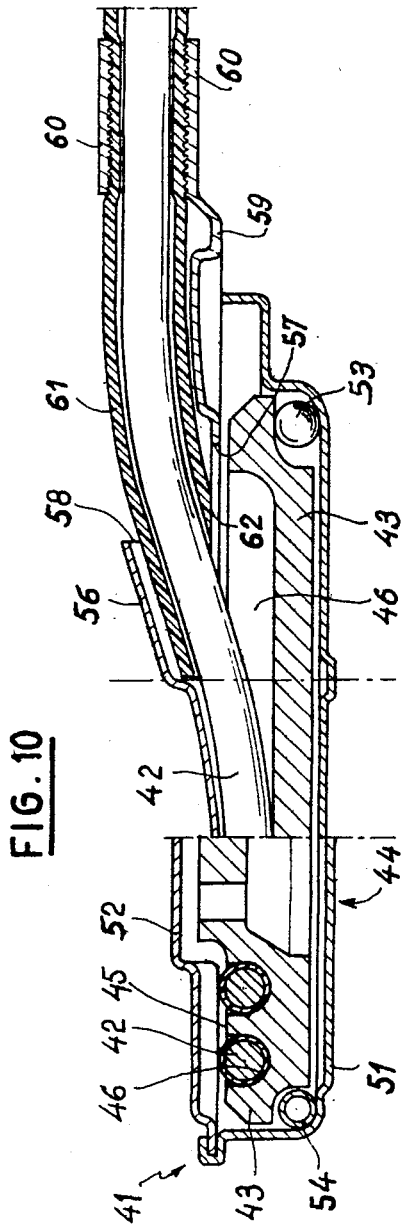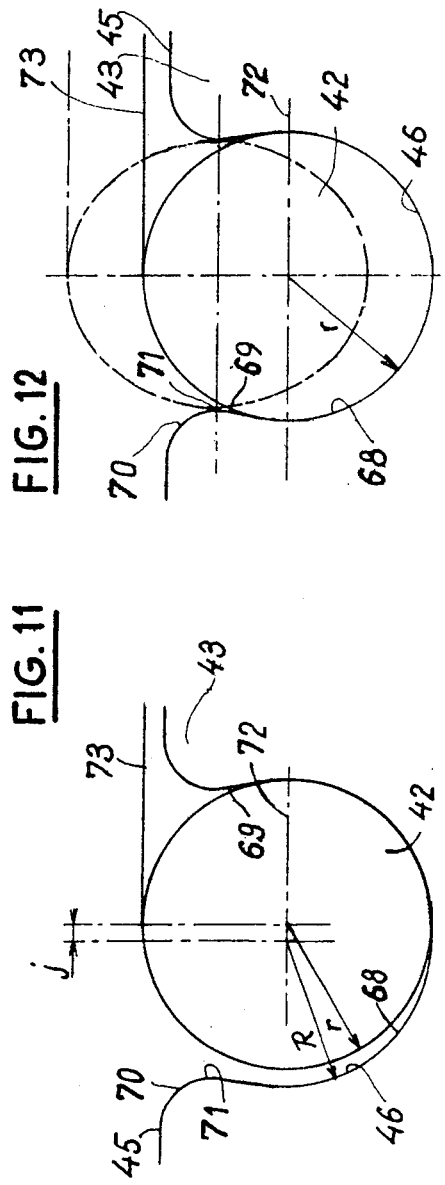

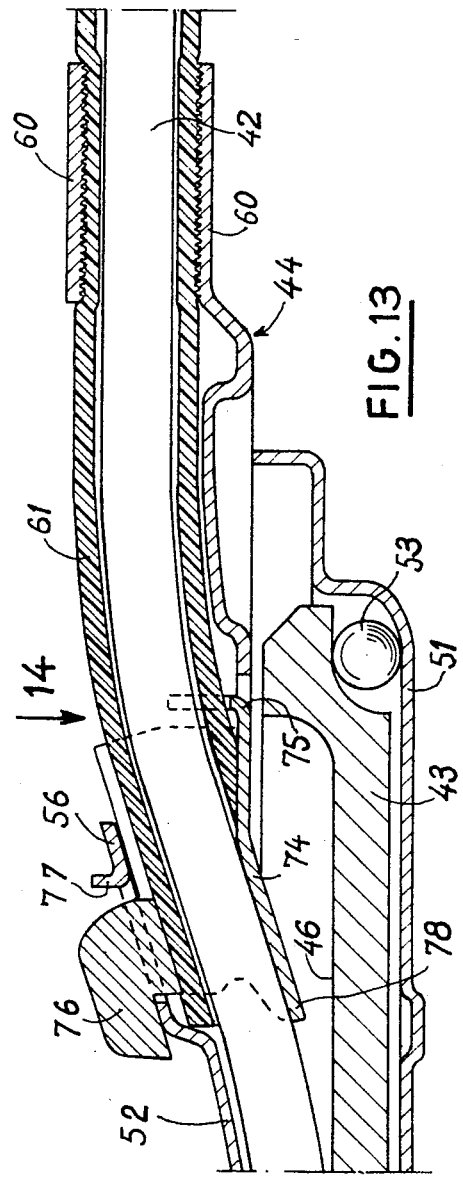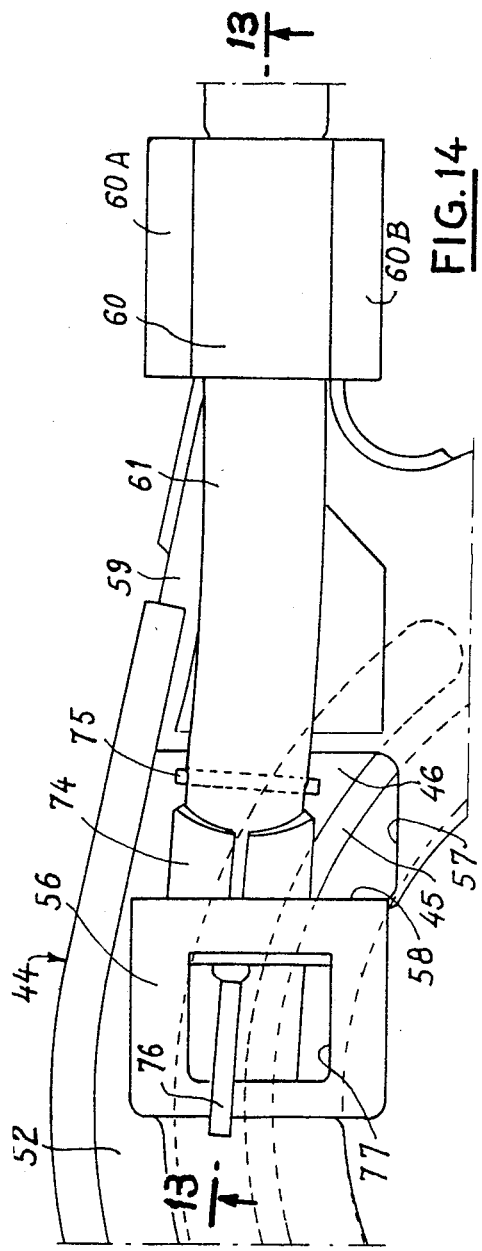

DEVICE FOR WINDING A TRACTION AND THRUST CABLE AND A WINDOW-RAISER PROVIDED WITH SUCH A DEVICE

This application is a continuation of application Ser. No. 310,179, filed 10/9/81, now abandoned.

The present invention relates to a device for winding a traction and thrust cable. It more particularly relates to winding devices of the type comprising a rotary drum provided on one side with a generally spiral-shaped groove for receiving the cable. This device is in particular intended to actuate window-raisers of automobile vehicles.

The patent DE 285066 discloses a winding device of the aforementioned type which has the advantage of being capable of operating with smooth cables, for example steel cables having a sheath of plastics material, which results in a minimum of friction and noise and low sensitivity to temperature variations. However, this known device is incapable of pushing on a cable intended to transmit relatively great forces as is the case in an automobile window raiser since, in this case, the cable would buckle and leave the groove.

An object of the invention is to provide a winding device of the same type which has high efficiency in both directions of operation and avoids any risk of buckling of the cable.

The invention accordingly provides a winding device of the aforementioned type, wherein the drum is provided with a cap for retaining the cable in the groove and comprising a fixed plate placed against said side of the device.

If the groove has a section including undercut lateral walls, the cable is always urged toward the bottom of the groove when the drum rotates and this still further reduces friction between the cable and fixed cap.

In order to reduce the overall radial size, the groove may be formed by concentric arcs of a circle interconnected by connection regions.

As concerns the exit for the cable, there may be employed a tangential outlet tube mounted to be slidable in a roughly radial direction on the cap or, more simply, a Y-shaped tangential nozzle fixed to the cap. According to another embodiment, a flexible cable guiding sheath is anchored on the cap at a distance from the place where the cable issues from the groove and terminates at this place.

In a particularly satisfactory embodiment, a thrust rolling bearing is interposed between a peripheral track of the drum facing the side opposed to the exit of the cable and an adjacent track rigid with the cap.

According to another aspect, another object of the invention is to provide a winding device for a traction and thrust cable, comprising a rotary drum, a groove in the drum, a fixed cap for retaining the cable in the groove, and a flexible cable guiding sheath which is anchored on the cap at a distance from a place where the cable issues from the groove and terminates at said place.

Another object of the invention is to provide a window-raiser of the type comprising a cable connected to a slide, wherein the cable is fixed, at the end thereof opposed to the slide, to a winding device such as that defined hereinbefore. Preferably, for reasons of safety, the direction of winding the cable in the groove and the connection between the cable and the slide are such that the window closing position corresponds to a maximum winding or unwinding radius.

The invention will be described hereinafter in more detail with reference to the accompanying drawings which represent embodiments of the invention.

In the drawings:

FIG. 1 is an outside plan view of a winding device according to the invention;

FIG. 2 is a sectional view, taken on line 2—2 of FIG. 1, of this device;

FIG. 3 is a plan view corresponding to FIG. 1, the cap having been removed;

FIG. 4 is a view of a detail of the device;

FIG. 5 is a view of the free end portion of the cable in the application of the device of FIGS. 1 to 3 to a window-raiser;

FIGS. 6 and 7 are diagrams of the mounting of the device of FIGS. 1 to 4 in its application to a window-raiser;

FIG. 8 is an outside plan view of a winding device in accordance with another embodiment of the invention;

FIG. 9 is a sectional view of this device taken on line 9—9 of FIG. 8;

FIG. 10 is a sectional view taken on line 10—10 of FIG. 8;

FIGS. 11 and 12 show, to an enlarged scale, two modifications of the section of the groove;

FIG. 13 is a partial view similar to FIG. 10, to an enlarged scale, of a modification of the device of FIGS. 8 to 10, this view being in section taken on line 13—13 of FIG. 14;

FIG. 14 is a corresponding view in the direction 14 of FIG. 13.

The device shown in FIGS. 1 to 4 is adapted to actuate a traction and thrust cable 2, also termed a "push-pull cable". It comprises mainly a drum 3 and a retaining cap 4.

The drum 3 has the general shape of a planar disc whose radially outer portion is hollowed out to provide a generally spiral-shaped groove 5. More precisely, the groove 5 extends from its outer end 6 in the vicinity of periphery of the disc through three quarters of a circle 7 coaxial with the disc, then a quarter of a circle 8 whose centre 0 is offset relative to that of the disc, then through a short rectilinear segment 9, then through another three quarters of a circle 10, all these parts being tangentially interconnected. This configuration results in a minimum radial overall size of the drum 3 for a given length of the groove 5.

The radially inner region of the disc 3 forms a cup 11 having a rectangular section open on the same side as the groove 5. The peripheral wall of this cup is arranged in the form of inner teeth 12 and its centre defines a hub 13.

As can be seen better in FIG. 4, the groove 5 has an isosceles trapezium section and its lateral walls 5a have a slight undercut. The width of the entrance of this groove is roughly equal to the outside diameter of the cable 2 whose end portion is suitably secured at a point 14 of the disc 3 close to the inner end of the groove 5; ie. of the three quarters of the circle 10.

The cap 4, which is solely shown in FIGS. 1 and 2, is a rectangular plate adapted to be fixed to a supporting structure, eg. a door of a vehicle, by means of screw apertures 15, and placed against the side of the disc 3 provided with the groove 5.

The cap 4 has an eccentric cup 16 which projects outwardly and a pin 16a projecting from its inner side, the hub 13 of the drum 3 being journalled on this pin 16a. The bottom of the cup 16 has extending therethrough a driving shaft 17 on the inner end of which is keyed a pinion 18 engaged with the teeth 12 of the drum 3.

The cup 16 contains a unidirectional driving mechanism 19 known under expression "auto-lock". This mechanism, which is diagrammatically represented by a coil spring in FIG. 2, is well known per se and will not be described in more detail. The function of this mechanism will be clear hereinafter.

The cap 4 has adjacent its periphery a roughly radial notch 20 and two studs 21. Slidable on this region is a plate 22 provided with two slots 23 through which the studs 21 extend. Fixed on the plate 22 is a tangential outlet tube 24 whose end portion 25 is upwardly inclined from its inlet orifice 26, which is downwardly open in the plane of the plate 22. The cable 2 thus passes through the tube 24, which guides it, in leaving the winding plane of the groove 5 (see FIG. 2). FIGS. 2 and 3 show the cable fully wound in this groove and FIG. 1 corresponds to the end of the unwinding of the cable, the plate 22 having slid inwardly a distance corresponding to the radial distance between two turns of the spiral groove 5.

The cable 2 comprises a core 27 of steel covered with a sheath 28 of plastics material (FIG. 5). The core 27 may be braided and fitted in its sheath 28, or the cable may be made by a co-extrusion of its two parts. In use, after issuing from the tube 24, the cable is guided in a passageway having a circular section shown in FIG. 5. At its free end, the sheath 28 is eliminated and replaced, on the same length of cable, by a sleeve 30 rigid with the device to be shifted. The sleeve 30 is connected to said device by a flange 31 which slides in a longitudinal groove 32 in the passageway 29. This fixing arrangement is simple and results in no guiding play at the end of the cable 2.

In operation, the rotation of the driving shaft 17 under the action of a crank or a motor (not shown), drives the disc 3 in rotation in one direction or the other and winds or unwinds the cable 2. When the point at which this cable issues from the groove 5 is located on three quarters of a circle 7 or 10, the plate 22 remains stationary. When this point pertains to a transition region 8 or 9, the plate moves radially under the effect of the cable itself.

In each direction of rotation, the cable, which has a tendency to radially contract or expand, is applied against one of the two lateral walls 5a of the groove 5 and, owing to the fact that these walls are undercut, it is urged toward the bottom of the groove. At the price of a slight clearance between the cable and the groove, this eliminates any friction between the cable and the fixed cap 4 and ensures that the cable is only in contact with the disc 3 which rotates at the same speed at all points thereof.

Thus the cable only rubs in the outlet tube 24 and in the guide passageway 29. Further, as the surface of the cable is of a smooth plastics material, its coefficient of friction in these two parts may be low. Consequently, the device 1 has high efficiency and, as it affords a perfect guiding of the cable throughout the length thereof, there is no risk of buckling. The device 1 is consequently capable of shifting elements requiring relatively great forces, such as the windows of automobile vehicles.

In this application, it must be arranged that a manual action on the window is incapable of lowering the latter. This is the function of the "auto-lock" mechanism 19, well known in the art.

The device 1 exhibits an interesting property in its application to window-raisers. Owing to the fact that the radius of unwinding the cable 2 varies, the thrust or traction force exerted by the cable also varies for a constant driving torque on the shaft 17. Thus it is possible to achieve directly a minimum force in the upper position of the window, in particular the end of the closure, which is advantageous from the safety point of view. For this purpose, if the winding is such as that shown in FIG. 3, the cable must act on the slide 33 rigid with the base of the window from above in sliding along a rail 34 fixed to the door (FIG. 7). By way of a modification, the cable may act on the slide 33 from below (FIG. 6), but the direction in which it is wound in the groove 5 must be reversed, ie. the point 4 at which it is fixed to the drum 3 must be adjacent the outer periphery of the latter. This is made possible by changing the plane of the cable as it issues from the groove 5. In both cases, it is easy to adapt the variation in the radius to the desired variation in the force exerted.

As a modification, the plate 22 of the device for the outlet of the cable may have a finger member (not shown) which is engaged, through a slot (not shown) in the cap 4, in a groove (not shown) in the disc 3 parallel to the groove 5. The plate 22 is then positively displaced during the winding and unwinding of the cable.

In another modification, the cable outlet device 22 to 26 may be replaced by a simple Y-shaped tangential outlet nozzle fixed to the cap 4. Such a nozzle 35, diagrammatically illustrated in dot-dash lines in FIG. 3, comprises a downwardly open convergent inlet, overlapping the entire radial extent of the groove 5, and a tubular outlet similar to that shown in FIGS. 1 and 2.

It will be understood that the disc 3 may be driven in rotation by means other than those illustrated, for example by an outer or bevel set of teeth or a chain sprocket rigid with the disc. Further, note that, for the same overall size, in particular concerns thickness, the drum 3 may have one, two or more than two turns of cable, in accordance with requirements.

The device 41 shown in FIGS. 8 to 10 is adapted to actuate a traction and thrust cable 42, also termed a "push-pull" cable, consisting of a metal core 42A covered with a sheath 42B of plastics material. This device 42 mainly comprises a drum 43 and a housing 44.

The drum 43 has the general shape of a planar annular disc in a side 45 of which is hollowed out a groove 46 which has the same general spiral shape of small radial overall size as in FIGS. 1 to 4. The cable 42 projects slightly out of the groove 46 as will be explained hereinafter.

The inner periphery of the drum 43 has, on the side 45, inner teeth 47, and is then divergent to the opposite side 48. At the intersection of the outer periphery of the side 48 and the outer cylindrical surface 49 of the drum, a rolling track 50 having a section in the form of a quarter of a circle is provided.

The housing 44 is formed by a cup 51 closed by a cap 52. The cup 51 receives the drum, with interposition of balls 53, separated by separating means 54 (FIG. 10), between the radiused corner 55 thereof and the track 50. The two contacts of each ball 53 are inclined at roughly 45° to the axis X—X of the drum so that the ball bearing thus formed is both a thrust bearing and a bearing for centering the drum in its housing.

The radially outer part of the cap 52 has a generally planar shape with radially extending ribs for axially positioning the drum arranged 45° apart and contacting the outer generatrix of the cable 42. The free edge of the cup 51 is formed-over onto the periphery of the cap 52.

The cap 52 has at a point of its perimeter a projection 56 which is circumferentially open in the direction of the exit of the cable 42. This projection extends radially throughout the gap occupied by the groove 46 and a window 57 adjacent the opening 58 of the projection 56 is provided in the plane of the cap.

The cap further comprises, roughly on the axis of the opening 58, a tangential extension portion 59 which terminates in two knurled jaws 60. The latter which are clipped together at 60A and 60B (FIG. 8), surround and firmly lock the flexible tubular sheath 61 of plastics material which may be in particular formed by the end portion of the cable guiding passageway up to the slide of the base of the window (not shown). The sheath 61 is free between the jaws 60 and the projection 56 and it enters the latter and terminates in a bevelled edge 62 located in the general plane of the cap 52 and therefore perpendicular to the axis X—X of the drum 43.

In the embodiment shown in FIGS. 8 to 10, the cable 42 is anchored by the end thereof to the radially inner end of the groove 46 and extends along this groove until it enters the sheath 61 and issues from the projection 56 by way of the opening 58. When the drum rotates, the free end of the sheath 61 easily follows the variations in the radius of the cable outlet point in moving by a bending thereof from one radial end to the other of the projection 56.

The driving shaft 63 of the device 41 is guided to be parallel to the axis X—X by two bearings 64, 65 provided in aligned bosses of the cup 51 and cap 52. The shaft 63 carries a driving pinion 66, which is engaged with the teeth 47 of the drum, and a known mechanism 67 of the "auto-lock" type, shown diagrammatically in FIG. 9 without its spring, which is disposed between the drum and a boss of the inner wall of the cup 51. The shaft 63 extends out of this cup and is connected to an actuating device (not shown).

When the cable 42 passes from the groove 46 to the sheath 61, it changes its plane. The forces exerted on this cable consequently have an axial component. When the cable is under tensile stress, it tends to apply itself against the cap 52 which provides the required reaction. When the cable is under compressive stress, it tends to urge a peripheral point of the drum toward the cup 51. It is then the cup 51, to which the force is transmitted through balls 53 which are located substantially on the line of action of the cable, which provides the required reaction. Consequently, the drum remains in all cases perfectly positioned without any bending force being exerted on the shaft 63, even if excessive forces, for example at the end of the travel of the cable, are exerted on the latter through this shaft.

In FIGS. 9 and 10, the groove 46 has a section comprising a semi-circle of the diameter of the cable and two parallel rectilinear segments. This arrangement is particularly simple and gives satisfactory results. However, if it is desired to reduce friction between the cable and the cap 52, the section shown in FIG. 11 may be employed for the groove. This section comprises, in the bottom of the groove, an arc of a circle 68 having an angular extent of a little more than 180° and a radius R which is a little larger than the radius r of the cable 42, then two tangential rectilinear segments 69, then two rounded portions 70 connecting the groove to the side 45 of the drum. The entrance neck 71 of the groove is disposed, relative to the bottom of the latter, between the diametral level 72 and the outer level 73 of the cable which is outside the groove, so that it is possible, relative to the trapezoidal section shown in FIG. 4, to reduce the clearance $g=2(R-r)$ between the cable and the groove and consequently to reduce the lost travel of the shaft 63 at the beginning of the actuation in either direction.

In FIG. 11, the width of the neck 71 is slightly greater than the diameter $2r$ of the cable so that the latter freely enters the groove 46 and freely issues therefrom. In the modification shown in FIG. 12, on the other hand, the general section of the groove is the same but this width of the neck 71 is slightly less than the diameter of the cable and the radius of the arc of a circle 68 is equal to to the radius r of the cable. Therefore, there is no play of the cable in the groove and consequently no lost travel of the shaft 63. On the other hand, greater energy is required to cause the cable to enter the groove and leave the groove, since the cable clips into the groove as it passes through the neck 71.

While the end portion of the sheath 61 is merely bevelled in FIGS. 8 to 10, this end portion is reinforced in the modification of FIGS. 13 and 14 by a metallic tubular sleeve 74 which extends through the opening 58 of the projection 56 and the adjacent opening 57. The sleeve 74 is extended outwardly in the form of a cradle 75 which maintains the required curvature of the sheath 61 in the direction parallel to the axis X—X of the drum. At its other end, the sleeve 74 has a projecting portion 76 in the shape of a hook which extends through an opening 77 in the side of the projection 56 opposed to the drum with clearance, and, opposed to this projecting portion 76, a guiding nozzle 78 received in the groove 46 of the drum. The contact between the nozzle 78 and the bottom of the groove 46 is however avoided by the cooperation between the hook 76 and the projection 56.

Thus the sheath 61 may be guided without intervention of the cable 42 and this reduces friction. Further, in the event of an excessive thrust exerted on the cable, the tendency of the sheath 61 to buckle is definitely precluded by the abutment of the projection portion 76 against the outer radial edge of the opening 76.

It will moreover be understood that this manner of guiding the cable as it issues from the drum is also suitable for other types of winding devices for traction and thrust cables and in particular for devices in which the drum carries a groove in the cylindrical peripheral surface thereof.

Note that, in each embodiment of FIGS. 7 to 14, the axis of the driving pinion 66 is located, with respect to the axis X—X of the drum, in an angular position close to the projection 56, ie. close to the place where the cable issues from and enters the groove 46. This affords an advantageous balancing by means of the cooperation of the pinion 66 and teeth 47 of the tangential action exerted by the cable on the drum and correspondingly relieves the ball bearing 53 of stress.

By way of modification, the teeth 47 may moreover be provided on the outer periphery 49 of the drum. The pinion 66 would in this case extend through an opening in the cup 51 in the same angular position as the illustrated pinion 66.

Having now described our invention what we claim as new and desire to secure by Letters Patent is:

1. A device for winding a traction and thrust cable, comprising a rotary drum having a generally planar configuration and a central axis of rotation, a groove having a generally spiral configuration provided on one side of the drum and including an outer end disposed in the vicinity of the periphery of the drum for receiving the cable, the groove extending from the outer end through a first segment defined by three-quarters of a circle having a center disposed coaxially with the axis of the drum, a second segment defined by a quarter of a circle whose center is offset relative to the axis of the drum, a third segment defined by a rectilinear section, and thereafter a fourth segment defined by three-quarters of a circle whose center is disposed coaxially with the axis of the drum, wherein all segments of the groove are tangentially interconnected, and a cap including a fixed plate bearing against the one side of the drum for retaining the cable in the groove.

2. The device of claim 1 wherein the transverse cross-sectional configuration of the groove is trapezoidal with undercut lateral walls.

3. The device of claim 1 further including a tangentially disposed cable outlet tube carried by the cap for slidable movement in a generally radial direction with respect to the axis of the drum.

4. The device of claim 1 further including a Y-shaped tangential outlet nozzle carried by the cap and including an inlet having a width encompassing all radially extending cross sections of the groove.

5. The device of claim 1 further including a flexible sheath anchored on the cap at a distance from a point where the cable issues from the groove for guiding the cable.

6. A window-raiser comprising a traction and thrust cable having one end portion connected to a slide and the other end portion connected to a winding device, the device including a rotary drum having a generally planar configuration and a central axis of rotation, a groove having a generally spiral configuration provided on one side of the drum and including an outer end disposed in the vicinity of the periphery of the drum for receiving the cable, the groove extending from the outer end through a first segment defined by three-quarters of a circle having a center disposed coaxially with the axis of the drum, a second segment defined by a quarter of a circle whose center is offset relative to the axis of the drum, a third segment defined by a rectilinear section, and thereafter a fourth segment defined by three-quarters of a circle whose center is disposed coaxially with the axis of the drum, wherein all segments of the groove are tangentially interconnected, and a cap including a fixed plate bearing against one side of the drum for retaining the cable in the groove.

7. The window-raiser of claim 6 wherein the cable includes a steel core covered with a sheath of plastic material and the slide is fixed to the cable by a sleeve whose wall thickness is equal to the thickness of the sheath of plastic material, the sheath being eliminated in a length of the cable corresponding to the length of the sleeve.

8. The window-raiser of claim 6 wherein the direction of winding of the cable in the groove and the connection between the cable and the slide are such that the window closing position corresponds to a maximum cable winding radius.

9. The window raiser of claim 6 wherein the direction of winding of the cable in the groove and the connection between the cable and the slide are such that the window closing position corresponds to a maximum cable unwinding radius.

* * * * *